United States Patent [19]

Raisbeck et al.

[11] 4,061,284

[45] Dec. 6, 1977

[54] HARVESTER CUTTERHEAD

[75] Inventors: Wesley Paul Raisbeck; Merlyn Duane Bass; Bobbie Dean Whicker, all of Ottumwa; William Clair Davis, Blakesburg; Raymond Harry Fairbank, Ottumwa, all of Iowa

[73] Assignee: Deere & Company, Moline, Ill.

[21] Appl. No.: 723,036

[22] Filed: Sept. 14, 1976

[51] Int. Cl.$^2$ ............................................. B02C 18/18
[52] U.S. Cl. ..................................... 241/294; 83/349; 241/222
[58] Field of Search ..................... 241/101.7, 220, 221, 241/222, 223, 294; 56/139; 83/341, 342, 349

[56] References Cited

U.S. PATENT DOCUMENTS

| 1,797,673 | 3/1931 | Pender | 241/294 X |
| 3,030,841 | 4/1962 | Haas | 83/342 X |
| 3,357,467 | 12/1967 | Morkoski | 241/220 X |
| 3,380,501 | 4/1968 | Hoch | 241/222 UX |
| 3,974,970 | 8/1976 | Bertrand et al. | 241/294 X |

FOREIGN PATENT DOCUMENTS 2,216,640  10/1973  Germany ............................. 241/294

Primary Examiner—Roy Lake
Assistant Examiner—Howard N. Goldberg

[57] ABSTRACT

A forage harvester has a cylinder type cutterhead that includes a hollow cylindrical drum having a solid cylindrical peripheral wall and a pair of radial end plates to which a pair of axial, stub shafts are attached. Welded to the outside of the drum are a relatively large number of knife support members that are formed of relatively short sections of angle iron and extend parallel to the cutterhead axis. The support members are arranged in circumferential rows and are disposed at equal angular intervals, the support members in one row being angularly offset and relatively closely spaced from the support members in the adjacent row. Both edges of the support members are welded to the drum, so that the leading side of the support member is inclinded outwardly and rearwardly relative to the direction of rotation and functions as a deflector for crop material. The other exterior surface of each support member is flat, and a flat, relatively short knife is mounted on the flat surface of each support member, so that the knives are also disposed in circumferential rows. Each knife is bolted on to the support member and has a cutting edge along its leading edge at the cutterhead periphery, the ends of the knives in one row slightly overlapping the ends of the knives in the adjacent row, so that the knife cutting edges conjunctively generate a cylinder as the cutterhead rotates.

20 Claims, 4 Drawing Figures

HARVESTER CUTTERHEAD

BACKGROUND OF THE INVENTION

This invention relates to a cylinder or reel type cutterhead that is used in a forage harvester to reduce crop material to a size suitable for feed purposes.

Forage harvesters for removing crop material from the field, reducing the crop material in size, and discharging the reduced crop into a collector vehicle are well known, and most currently marketed forage harvesters utilize a cylinder or reel type cutterhead, the crop material being fed over a stationary shear bar in a generally radial direction into the rotating cutterhead which chops the crop into appropriate particle sizes. A typical cutterhead would have approximately an 18-inch diameter and a 22-inch length and, a number of knives are mounted on the cutterhead periphery and extend the length of the cutterhead, the knives generally being helical in shape. Although the number of knives provided varies widely, most modern high-capacity machines generally provide at least six knives to provide a sufficiently fine cut.

A major problem in operation of forage harvesters has been cutterhead maintenance, both in the maintenance of the knife cutting edge and replacement of knives damaged by the ingestion of foreign material. The relatively long helical knives are both difficult and expensive to replace. In addition, most previous cutterheads have utilized a relatively expensive and complicated knife mounting structure, so that the cost for both new and replacement cutterheads have been relatively high. Replacement of the entire cutterhead is necessary in some cases when foreign material is ingested, the entire cutterhead disintegrating when a hard object of substantial size is fed into the cutterhead.

It is known to provide such a cylinder-type cutterhead with a series of relatively short knives, the knives being arranged in circumferential rows that are disposed adjacent to one another so that the knife cutting edges conjunctively generate a cylinder extending the length of the cutterhead. Such machines have primarily been marketed in Europe and are illustrated in European prior art. While the short knives of such machines are more readily and less expensively replaced than the long full-length knives, such knives still have had a relatively complicated and expensive mounting structure, and the individual knives, although short, have nevertheless been relatively complicated.

SUMMARY OF THE INVENTION

According to the present invention, there is provided an improved cylinder-type cutterhead, utilizing a relatively large number of short knife sections that are arranged in circumferential rows disposed side by side on the cutterhead so that the knives conjunctively generate a solid cylinder as the cutterhead rotates.

An important feature of the invention resides in the simple, economical, and durable construction of the cutterhead supporting structure. More specifically, the supporting structure is made of a cylindrical drum, the knives being mounted on the cylindrical outer wall of the drum.

Another feature of the invention resides in the provision of a simple support member for each knife. More specifically, each support member is formed by an angled member secured to the periphery of the drum-like structure, each angled member having an inclined surface along its leading side and a second flat inclined surface normal to the surface on its leading side on which the knife is mounted.

Another feature of the invention resides in the use of a relatively short flat knife that mounts on the flat mounting surface of the knife support member, the flat knife being provided with a cutting edge parallel to the cutterhead axis and disposed at the cutterhead periphery.

Also according to the invention, each knife is removably secured to its associated knife mounting structure by a pair of easily accessible and removable bolts. Still another feature resides in the provision of a pair of slots in each knife that accommodate the mounting bolts, the slots extending through the rearward edge of each knife so that the knife can be removed by simply loosening the bolts and sliding the knife out from under the bolts, whereby the bolts do not have to be removed to change the knives. Also, according to the invention the slots are sufficiently elongated so that the knife will yield rearwardly to a limited degree upon striking foreign object.

An important feature in regard to the use of the short flat knives so that the knives are simple and inexpensive to make and can be individually replaced upon damage to one or more of the knives due to the ingestion of foreign material, eliminating the necessity for replacing all the knives in a cutterhead. Also, the cutterhead can even be repaired if one or more of the knife support structures are damages by simply welding a new support structure on the cutterhead drum.

Still another feature resides in the utilization of the forward or leading side of each supporting structure as a deflector surface for impelling material through the cutterhead discharge opening. Also, the solid drum-type support structure prevents material from getting inside of the cutterhead, as in the case in open type support structures, reducing the amount of recirculated material.

DESCRIPTION OF THE PREFERRED EMBODIMENT

Figure 1:
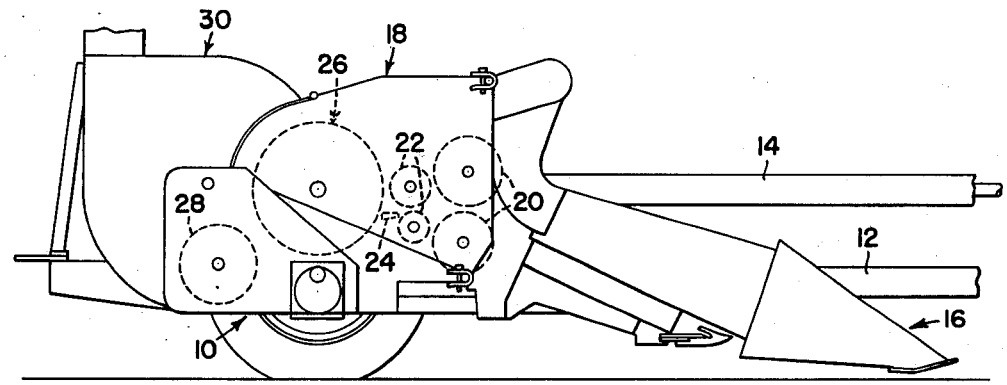
FIG. 1 is a somewhat schematic side elevation view of a portion of a forage harvester showing the disposition of the improved cutterhead.

The invention is embodied in a pull-type forage harvester that is partially illustrated in FIG. 1. The harvester includes a mobile main frame 10 having a forwardly extending drawbar 12 connectible to a tractor, the harvester also being powered from the tractor through a power shaft 14 as is well known.

Mounted on the harvester is a harvesting header or attachment indicated in its entirety by the numeral 16, the header in the illustrated embodiment being a row crop header adapted to sever row crop material from the field and deliver it rearwardly through an inlet in a cutterhead housing 18. The material entering the housing 18 is fed rearwardly between a pair of front feed rolls 20 and a pair of rear feed rolls 22 over a transverse shear bar 24 in a generally radial direction into a cylinder or reel type cutterhead 26, all of the above being well known construction and schematically shown in FIG. 1. The cutterhead registers with the shear bar 24 and reduces the size of crop material fed into the cutterhead, discharging the crop rearwardly to a transverse auger-type conveyor 28, which in turn feeds a blower type elevator 30 at the left side of the machine. The elevator 30 then propels the reduced crop material into a collector vehicle, typically a trailing wagon.

Figure 2:
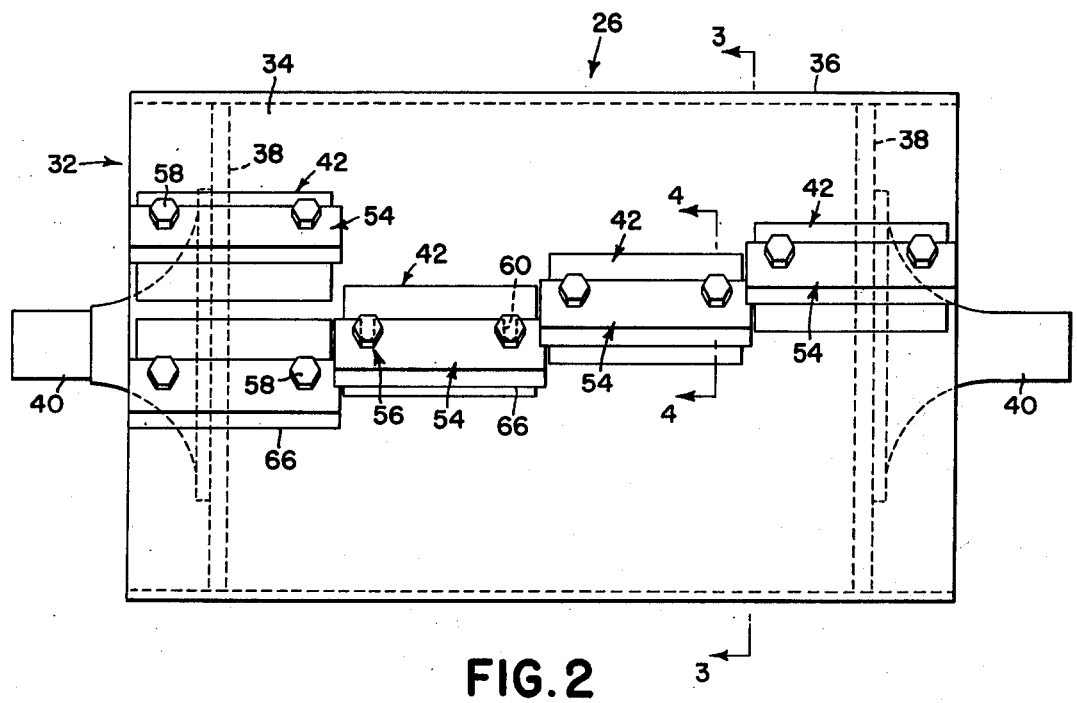
FIG. 2 is a front elevation view of the cutterhead embodying the invention, only one knife of all but the left end row of knives being illustrated to simplify the drawing.
Figure 3:
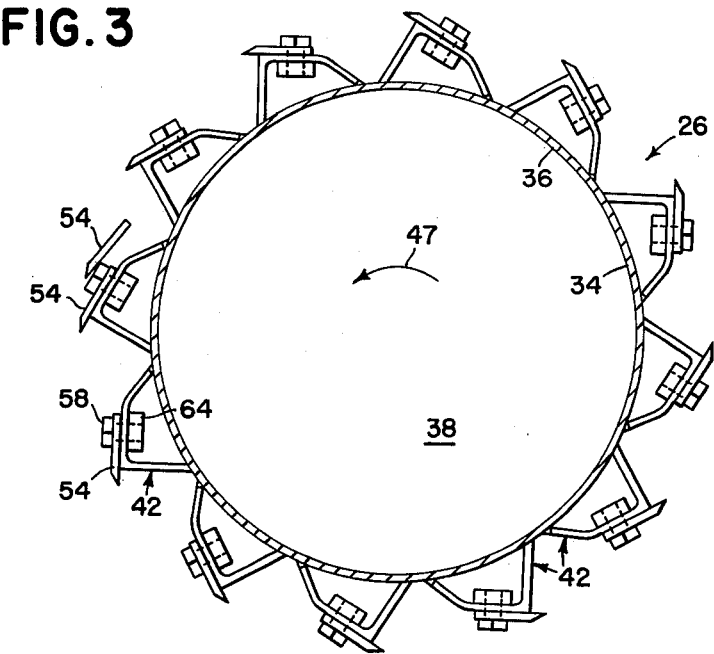
FIG. 3 is a section view of the cutterhead as viewed along the line 3—3 of FIG. 2, only one row of knives being illustrated with the exception of a single knife that is shown in section to illustrate the relative position of the knives in adjacent rows.

The cutterhead is shown in FIGS. 2 and 3 and includes a rotatable supporting structure, indicated in its entirety by the numeral 32. The supporting structure includes a hollow cylindrical drum 34 having a solid cylindrical side wall 36 and disk-like radial end plates 38 welded into opposite ends of the drum. A pair of stub shafts 40 are welded to the respective end plate 38 and project outwardly therefrom, the stub shafts 40 being axially aligned on the cutterhead axis to form the cutterhead shaft.

Attached to the outer periphery of the drum side wall 36 are a relatively large number of knife support members 42. The knife support members have an L-shaped cross section and can be formed from conventional angle iron, the support members being disposed longitudinally parallel to the cutterhead axis, with both longitudinal edges welded to the cutterhead periphery. Thus, each support member includes a front leg 44 having a deflector surface 46 on the leading or exterior side of the support member, the surface 46 being inclined outwardly and rearwardly relative to the direction of rotation, which is indicated by the numeral 47 in FIG. 3. Extending at right angles from the outer end of the front leg 44 is a rear leg 48, which has an exterior flat mounting surface 50 that is inclined outwardly and forwardly relative to the direction of rotation. The rearward portion 52 of the leg 48 is bent inwardly to reduce the circumferential dimension of the support member, and the opposite longitudinal edges of the support member are both welded to the drum periphery.

The support members are arranged at substantially equal angular intervals in circumferential rows. In the illustrated embodiment, four circumferential rows are provided, with 12 support members being provided in each row, the support members being disposed at 30° intervals about the cutterhead. Thus, the cutterhead has a total of 48 support members. At best seen in FIG. 2, the knife support members in one row are angularly offset from the knife support members in the adjacent row, with succeeding rows being offset in the same direction, the amount of offset of each row being selected so that the cumulative angular offset across the cutterhead is less than the total offset between adjacent support members in a given row. Thus, in the illustrated embodiment wherein there is a 30° gap between support members in a given row, there is a 7-½° angular offset in a rearward direction between support members in adjacent rows.

Mounted on the flat mounting surface 50 of each support member 42 is a flat knife 54 that extends parallel to the cutterhead axis. Each knife 54 is removably attached to its support member 42 by a removable fastener means, indicated generally by the numeral 56, here shown as a pair of bolts 58 having their heads engaging the exterior side of the knife and respectively extending through circumferential slots 60 in the knife and through bores 61 in the rear leg 48 of the support member. The inner ends of the bolts are threaded into threaded bores 62 in an elongated member 64 engageable with the underside of the rear support member leg 48 and disposed between the support member and the drum periphery. As is apparent, by tightening the bolts 58 in the member 64, the knife 54 is clamped to the flat knife mounting surface 50 of the support member. The slots 60 extend rearwardly through the rear edge of the knife and also extend forwardly beyond the normal position of the bolt shank. Thus, each knife 54 can be removed by loosening the pair of mounting bolts 58 and sliding the knife forwardly. The clearance between the bolt shank and the front of the slot permits rearward displacement of the knife when an excessive rearward force is applied to the knife, such as when a foreign object enters the cutterhead.

As is apparent, each knife has a cutting edge 66 along its leading edge, the cutting edge extending parallel to the cutterhead axis. Each knife also includes a heel surface 68 rearwardly of the cutting edge 10.

As best seen in FIG. 2, the knife support members 42 in one row are spaced a short distance from the support members in the adjacent rows, and the knives 54 are slightly longer than the support members 42 so that they overlap both ends of the support member. Preferably, the knifes in one row extend almost to the support members of the adjacent row, so that there is a small amount of overlap between the knives of adjacent rows. However, since the support members and consequently the knives in one row are angularly offset from the knives and support members in the adjacent row, there is no interference between the overlapping knives. The position of one of the knives in an adjacent row is illustrated in FIG. 3 for the knife in the 9 o'clock position. Since the knives overlap to a small degree, there is no gap in the cylinder that the knife cutting edges trace as the cutterhead rotates that would allow any material to enter the cutterhead without being engaged by a knife.

As previously indicated, there are four rows of knives of 12 knives in each row in the illustrated embodiment, although different numbers of knives in each row and different number or rows could be provided within the scope of the invention. The cutterhead diameter in the preferred embodiment is approximately 18 inches, with the diameter of the drum 34 being approximately 14 inches, so that each of knife cutting edge 66 is approximately 2 inches from the drum periphery. The drum length and consequently the cutterhead width is approximately 22 inches, so that each knife is slightly over 5½ inches long.

Normally the heel surface 68 is angled inwardly from the cutting edge 66 and provides some degree of heel relief. The cutterhead can be sharpened by conventional means, although a hard surface can be applied to at least a portion of the heel surface 68 of each knife, as described in U.S. Pat. No. 3,635,271, also assigned to the assignee herein. Such hard surfacing maintains the sharpness of the cutting edge for a longer period of time and can also provide a self-sharpening effect as described in said patent, although when such knives become damaged or dulled, they are normally discarded rather than resharpened. The simple, inexpensive construction of the knives herein lends itself to such a throw-away concept.

Figure 4:
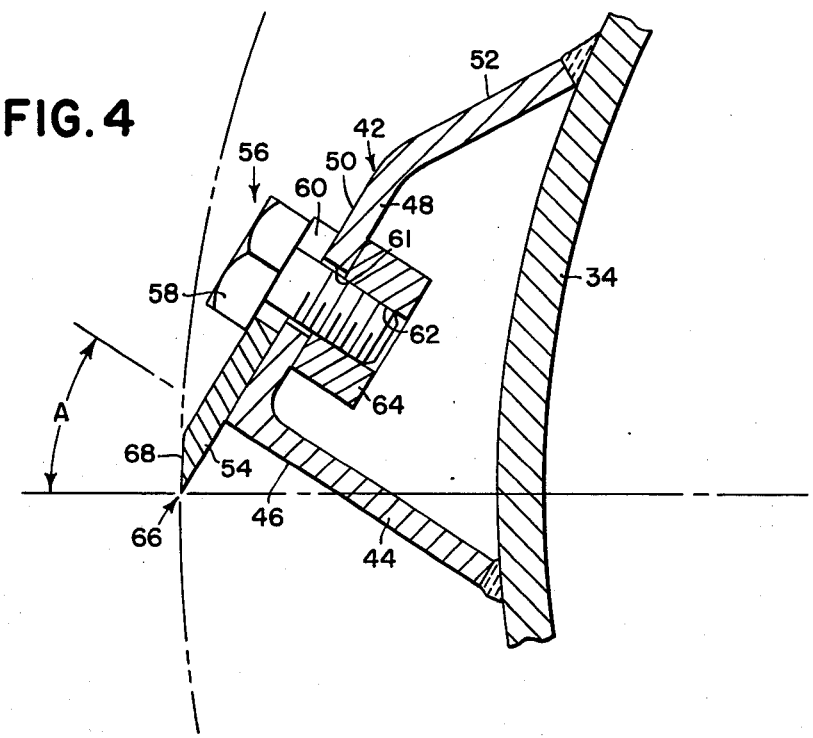
FIG. 4 is an enlarged section view of one of the knives through one of the mounting bolts as viewed along the line 4—4 of FIG. 2.

As previously described, the front surface 46 of each knife support member 42 is inclined outwardly and rearwardly relative to the direction of cutterhead rotation. As shown in FIG. 4, the surface 46 forms an acute angle with a radial line or plane through the cutterhead axis and through the knife cutting edge, the angle being indicated by the letter A in FIG. 4. In the illustrated embodiment, the angle is 30° so that the knife mounting surface 50 would make a 60° angle with the same plane. The surface 46 functions as a paddle or impeller to help convey material, and it has been found that a 30° angle on the surface provides an efficient impeller for the particular knife structure illustrated. While the angle is somewhat critical for proper conveying of material, it is believed that a range of angles would be acceptable. In the type of machine illustrated, it has been found that an angle from 30° to 35° has been acceptable for the angle A, while in other machines, wherein the cutterhead normally cuts the material and also is used as an impeller to propel material into the collector vehicle, an angle of 45° has been acceptable. As is apparent from the drawings, a certain minimum angle is necessary, so that the flat mounting surface is sufficiently angled to provide clearance for the mounting bolts 58 from the cutterhead periphery. Obviously, if the bolts extended beyond the periphery, they would interfere with the proper registry of the cutterhead with the shear bar 24.

In operation, as previously described, the material is fed in a generally radial direction into the cutterhead over the shear bar 24, the cutterhead registering with the shear bar to reduce crop material as it moves over the shear bar, the length of cut depending on the rate material is fed into the cutterhead and the number of knives thereon, since normally the cutterhead is rotated at a constant speed. As previously described, the knives in adjacent rows are slightly offset angularly so that not all rows register with the shear bar at the same time to distribute the load on the cutterhead. As is apparent in FIG. 3, the slight angular offset of adjacent rows produce an overall effect similar to the currently conventional helical knives.

As is also apparent, the individual knives are of very simple construction and can be easily replaced by simply loosening the mounting bolts for each knife, sliding out the knife, and inserting a new one. The bolts are easily accessible, and in the event that one or more knives are damaged during operation, the knives can be quickly and inexpensively replaced. As is also apparent, the drum-like supporting structure with the angle iron type knife support members mounted on the periphery of the drum provide a simple, durable, and economical construction for the overall cutterhead, so that the improved cutterhead is less expensive to start with, and simpler and less expensive to repair or maintain.

We claim

1. A cylinder type cutterhead for a harvesting machine comprising: a rotatable, hollow drum having a generally cylindrical peripheral surface and axial shaft means; a plurality of knife support members mounted on the peripheral surface in a plurality of circumferential rows, each support member including a deflector surface on its leading side during normal cutterhead rotation and a relatively flat knife mounting surface trailing the deflector surface and inclined inwardly from its leading edge; a plurality of substantially flat knives respectively mounted on the knife mounting surfaces of the support members, each knife having an axial length substantially less than the axial length of the cutterhead and including a cutting edge along its leading edge generally parallel to the cutterhead axis, the ends of the knives mounted in one row of support members being axially proximate to the opposite ends of the knives in the adjacent row; and removable fastener means removably attaching each knife to its respective support member so that the knife cutting edges are disposed at the cutterhead periphery, substantially equidistant from the cutterhead axis, the knife cutting edges generating a cylinder as the cutterhead rotates.

2. The invention defined in claim 1 wherein the drum includes a single piece cylindrical outer wall and a pair of radial members respectively attached to the opposite ends of the outer wall.

3. The invention defined in claim 2 wherein the shaft means comprises a pair of shaft stubs respectively attached to the opposite radial members and projecting outwardly therefrom.

4. The invention defined in claim 1 wherein the outer diameter of the drum is at least two-thirds of the total diameter of the cutterhead.

5. The invention defined in claim 1 wherein at least three rows of knives are provided and the knives in each row are disposed at substantially equiangular intervals.

6. The invention defined in claim 5 wherein the knives in one row are angularly offset from the knives in the adjacent row.

7. The invention defined in claim 6 wherein the knife support members in one row are axially spaced from the knife support members in the adjacent row, the opposite axial ends of each knife overhanging the opposite axial ends of their respective support members.

8. The invention defined in claim 7 wherein the ends of the knives in one row overlap the opposite ends of the knives in the adjacent row, but are spaced from the knife supporting structures in the adjacent row.

9. The invention defined in claim 1 wherein each knife includes a pair of axially spaced slots extending through the knife normal to the flat side and elongated in a circumferential direction, each fastening means including a pair of bolts having heads seating against the outer side of the knife and an internally threaded means connected to the support structure, the bolts being threaded into the internally threaded means to clamp the knife to the support member.

10. The invention defined in claim 9 wherein each slot extends through there rear edge of the knife so that the knife can be removed in a forward circumferential direction when the respective bolts are loosened without completely removing the bolts.

11. The invention defined in claim 1 wherein the deflector surface of each support member is inclined inwardly in the direction of normal rotation relative to a radial line through the cutterhead axis and through said deflector surface.

12. The invention defined in claim 11 wherein said deflector surface forms an angle between 25° and 40° with said radial line.

13. The invention defined in claim 11 wherein the deflector surface of each support member forms approximately a right angle with the knife mounting surface.

14. A cylinder type cutterhead for a harvesting machine comprising: a rotatable, hollow drum having a generally cylindrical outer wall, a pair of radial members attached to the outer wall adjacent the opposite ends of the drum, and an axial shaft means connected to the radial members; a plurality of knife support members mounted on the outer wall in a plurality of circumferential rows, each support member including a flat knife mounting surface; a plurality of knives respectively mounted on the knife support members so that the knives are also arranged in circumferential rows, each knife having a cutting edge along its leading edge generally parallel to the cutterhead axis at the cutterhead periphery and having an axial length substantially less than the length of the cutterhead at said periphery, so that the knives conjunctively generate a solid cylinder as the cutterhead rotates, the diameter of the drum being at least two-thirds the diameter of said generated cylinder; and fasteners means for removably clamping the knives to the knife mounting surfaces of the respective knife supports.

15. The invention defined in claim 14 wherein at least three rows of knives are provided, the supports and knives in one row being angularly offset from the supports and knives of the adjacent row.

16. The invention defined in claim 15 wherein the ends of the knives in one row overlap the opposite ends of the knives in the adjacent row.

17. The invention defined in claim 14 wherein each knife support member includes a deflector surface along its leading side, said deflector surface being inclined inwardly in a rotationally advanced direction relative to a radial line and operative to engage and accelerate material between the knife cutting edge and the drum during normal rotation of the cutterhead.

18. The invention defined in claim 17 wherein the knife mounting surface of each knife support is disposed at approximately right angles to the deflector surface.

19. The invention defined in claim 18 wherein each knife is flat and has a flat surface seating against the flat surface of the knife support member, the cutting edge of the knife being disposed in advance of the support member knife mounting surface.

20. A cylinder type cutterhead for a harvesting machine comprising: a rotatable supporting structure; a plurality of knife support members mounted on the supporting structure in a plurality of circumferential rows, each support member having a generally L-shaped cross section with front and rear legs extending longitudinally of the cutterhead, each support member leg having a longitudinally extending edge attached to the supporting structure, the front leg including a deflector surface on its leading side during normal cutterhead rotation and the rear leg including a relatively flat knife mounting surface trailing the deflector surface and inclined inwardly from its leading edge, the deflector surface extending inwardly from the knife mounting surface to the edge of the front leg attached to the support structure and being inclined inwardly in a rotationally advanced direction from the knife mounting surface to engage and accelerate material outwardly from the support structure during normal rotation of the cutterhead; a plurality of substantially flat knives respectively mounted on the knife mounting surfaces of the support members, each knife having an axial length substantially less than the axial length of the cutterhead and including a longitudinally extending cutting edge along its leading edge, the ends of the knives mounted in one row of support members being axially proximate to the opposite ends of the knives in the adjacent row; and removable fastener means removably attaching each knife to the respective support member so that the knife cutting edges are disposed at the cutterhead periphery, substantially equidistance from the cutterhead axis, the knife cutting edges generating a cylinder as the cutterhead rotates and the deflector surface of each support member extending between the support structure and the knife mounted thereon for a distance substantially as great or greater than the width of the knife in a circumferential direction.

* * * * *

UNITED STATES PATENT OFFICE
CERTIFICATE OF CORRECTION

Patent No. 4,061,284     Dated 6 December 1977

Inventor(s) Wesley Paul Raisbeck, Merlyn Duane Bass, Bobbie Dean Whicker, William Clair Davis, Raymond Harry Fairbank It is certified that error appears in the above-identified patent and that said Letters Patent are hereby corrected as shown below:

Column 6, line 49, delete "there" and insert --the--.

Column 7, line 15, delete "fasteners" and insert --fastener--.

Column 8, line 21, delete "support" and insert --supporting--.

Signed and Sealed this

Sixteenth Day of May 1978

[SEAL]

Attest:

RUTH C. MASON
Attesting Officer

LUTRELLE F. PARKER
Acting Commissioner of Patents and Trademarks